Patented Dec. 26, 1922.

1,439,915

UNITED STATES PATENT OFFICE.

ALBERT J. SCHULTZ, OF MADISON, WISCONSIN.

SHOE-CLEANING COMPOSITION.

No Drawing. Application filed September 26, 1921. Serial No. 503,443.

*To all whom it may concern:*

Be it known that I, ALBERT J. SCHULTZ, a citizen of the State of Wisconsin, residing at the city of Madison, in the county of Dane and State of Wisconsin, have invented a new and useful Shoe-Cleaning Composition, of which the following is the specification.

The object of my invention is to produce an effective and convenient liquid composition to be used for the cleaning of shoes, especially canvas, kid and suede shoes. My composition consists of a mixture:

1. One pound of zinc oxide, (pure).
2. One teaspoon benzine.
3. Five drops mucilage.
4. One ounce toilet water.
5. Balance pure, soft water, enough to make, together with the other elements, one gallon in amount.

In preparing the above composition for cleaning canvas shoes and the like, I mix the benzine, mucilage and toilet water together, and then introduce into the same the zinc oxide, thoroughly stirring the above elements together, until they are thoroughly and smoothly mixed; to the composition I add the pure, soft, cold water, stirring it in until it is a smooth, even fluid mixture.

In using the mixture, I first brush off the dry shoe with a clean, stiff brush, until all exterior dirt is removed, and then apply the above mixture with a clean, stiff brush until the shoe is clean, and when it is dry again, brush it with a stiff, clean brush. The mixture, as above described, is especially useful in cleaning white canvas shoes. If used for cleaning kid shoes and suede shoes, the mixture should be varied as follows:—

1. One and one-half pounds of zinc oxide.
2. One and one-half teaspoons of benzine.
3. Eight drops of mucilage.
4. Two ounces of toilet water.
5. Mix with pure, soft, cold water as above.

I claim:—

1. Shoe cleaning composition comprising one pound of zinc oxide, one teaspoonful of benzine, five drops of mucilage, one ounce of any toilet water, and balance pure, soft water, enough to make, together with other elements, one gallon in amount.

2. A shoe cleaning composition comprising one pound of zinc oxide, one teaspoonful of benzine, five drops of mucilage, mixed with and made fluid by pure, soft water, enough to make, together with other elements, one gallon in amount.

3. A shoe cleaning composition comprising the following ingredients, mixed in about the following proportions, viz: from one to one and one-half pounds of zinc oxide, from one to one and one-half teaspoonfuls of benzine, from five to eight drops of mucilage, and water sufficient to make one gallon.

4. A shoe cleaning composition comprising the following ingredients, mixed in about the following proportions, viz: from one to one-half pounds of zinc oxide, from one to one and one-half teaspoonfuls of benzine, from five to eight drops of mucilage, from one to two ounces of toilet water, and sufficient soft water to make one gallon of the mixture.

Signed at Madison, in the county of Dane and State of Wisconsin, this 19th day of September, A. D. 1921.

ALBERT J. SCHULTZ.